3,035,066
QUATERNARY AMMONIUM SALTS OF 3β,20β-DIAMINO-ALLOPREGNANES
Percy George Holton, Mexico City, Mexico, assignor to Syntex S.A., Mexico City, Mexico, a corporation of Mexico
No Drawing. Filed July 6, 1961, Ser. No. 122,083
3 Claims. (Cl. 260—397)

The present invention relates to novel cyclopentanophenanthrene derivatives and to a process for the production thereof.

More particularly the present invention relates to quaternary ammonium salts of 3β,20β-diamino-allopregnane derivatives.

The novel compounds of the present invention which are hypotensive agents and muscle relaxants with ganglionic blocking activity are represented by the following formula:

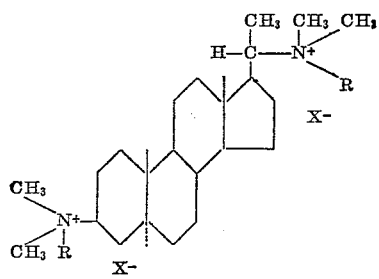

In the above formula R represents lower alkyl and X may be bromine or iodine.

The novel compounds of the present invention are prepared by the process illustrated by the following equation:

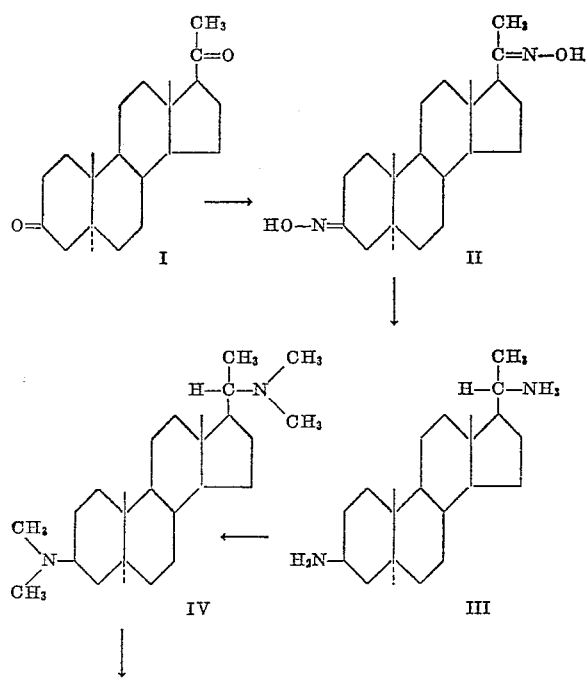

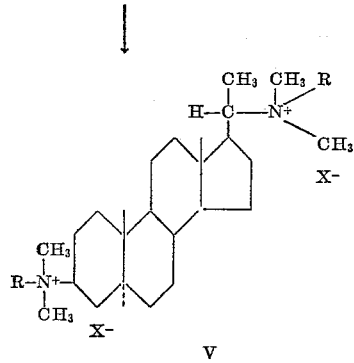

In the above formulas R and X have the same meaning as hereinbefore set forth.

In practicing the process outlined above the starting compound allopregnan-3,20-dione is conventionally treated with hydroxylamine hydrochloride furnishing the corresponding bis-oxime (II) which upon reduction with sodium-ethanol affords 3β,20β-diamino-allopregnane (III).

This diamine is refluxed with formic acid and formaldehyde for a period of time of the order of 2 hours thus furnishing the corresponding 3β,20β-bis(N,N-dimethylamino) derivative (IV).

Treatment of this steroid with a lower alkyl halide as for example, methyl iodide, affords the corresponding bis-quaternary ammonium halide of the 3β,20β-bis-(N,N-dimethylamino) compounds.

The following specific examples serve to illustrate but are not intended to limit the scope of the present invention:

*Example I*

A mixture of 2 g. of allopregnane-3,20-dione, 2 g. of hydroxylamine hydrochloride, 4 g. of sodium acetate and 250 ml. of 80% methanol was heated under reflux for 18 hours. The mixture was cooled, diluted with water, and the formed solid collected by filtration. Recrystallization from ethyl acetate afforded the bis-oxime of allopregnan-3,20-dione.

A solution of this bis-oxime in 200 cc. of n-butanol was heated to reflux temperature and there were added portionwise 10 g. of sodium. After total dissolution of the metal, the mixture was diluted with an equal volume of water and acidified with acetic acid. It was then evaporated under reduced pressure until all the butanol had been removed. The aqueous solution was washed with ether, then alkalized with 10% sodium carbonate solution and the liberated diamine extracted with methylene chloride. The extract was washed with water, dried over anhydrous sodium sulfate and evaporated to dryness. Recrystallization from methanol afforded 3β,20β-diamino-allopregnane.

*Example II*

1.5 g. of the foregoing diamine was refluxed for 2 hours with 4 cc. of 90% formic acid and 3 cc. of 40% formaldehyde. The mixture was then evaporated under reduced pressure, alkalized with sodium carbonate solution and extracted with ether. The extract was dried and evaporated to dryness. Recrystallization from methanol afforded 3β,20β-bis-(N,N-dimethylamino)-allopregnane.

*Example III*

To a solution of 1 g. of the foregoing diamine in 7.5 cc. of acetonitrile was added 1.5 cc. of methyl iodide and the mixture was heated under reflux for 8 hours. Then it was cooled, diluted with an equal volume of ether and the formed solid collected. Recrystallization from methanol-ether afforded 3β,20β-bis(N,N-dimethylamino)-allopregnane-bis-methoiodide.

*Example IV*

3β,20β - bis - (N,N - dimethylamino)-allopregnane was treated following the technique described in Example III except that methyl iodide was substituted by ethyl bromide, thus furnishing 3β,20β-bis-(N,N-dimethylamino)-allopregnane-bis-ethobromide.

I claim:
1. A compound of the following formula:

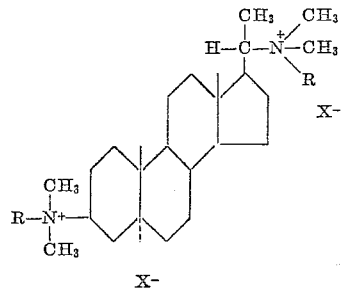

wherein R is a lower alkyl group and X is a member of the group consisting of bromine and iodine.
2. 3β,20β - bis - (N,N - dimethylamino) - allopregnane-bis-methoiodide.
3. 3β,20β - bis - (N,N - dimethylamino) - allopregnane-bis-ethobromide.

No references cited.